United States Patent
Oldham, Jr. et al.

(10) Patent No.: US 11,769,999 B2
(45) Date of Patent: *Sep. 26, 2023

(54) OPEN NEUTRAL DETECTOR

(71) Applicant: Southwire Company, LLC, Carrollton, GA (US)

(72) Inventors: Donald Paul Oldham, Jr., Trinity, FL (US); Hamze Moussa, Palm Harbor, FL (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,757

(22) Filed: Dec. 1, 2022

(65) Prior Publication Data

US 2023/0098372 A1 Mar. 30, 2023

Related U.S. Application Data

(63) Continuation of application No. 17/711,582, filed on Apr. 1, 2022, now Pat. No. 11,545,825, which is a
(Continued)

(51) Int. Cl.
   *H02H 3/33* (2006.01)
   *H02H 5/10* (2006.01)
   *H02H 3/20* (2006.01)

(52) U.S. Cl.
   CPC .............. *H02H 3/338* (2013.01); *H02H 3/20* (2013.01); *H02H 5/10* (2013.01); *H02H 5/105* (2013.01)

(58) Field of Classification Search
   CPC .......... H02H 3/338; H02H 5/105; H02H 5/10; H02H 3/20
(Continued)

(56) References Cited

U.S. PATENT DOCUMENTS 3,987,341 A 10/1976 Clark
4,067,054 A 1/1978 Clark
(Continued)

FOREIGN PATENT DOCUMENTS

AU 680015 B2 3/1995
AU 2005297402 A1 4/2006
(Continued)

OTHER PUBLICATIONS

Final Office Action for U.S. Appl. No. 17/121,296, dated Feb. 15, 2022, United States Patent and Trademark Office, USA.
(Continued)

*Primary Examiner* — Dharti H Patel
(74) *Attorney, Agent, or Firm* — Alston & Bird LLP

(57) ABSTRACT

An apparatus for detecting an open neutral condition in a split phase power system is described. The apparatus includes two powered lines providing output electricity to an electrical distribution system and a shared neutral line providing a grounded neutral to the first and second powered lines. The apparatus is configured for detecting when an open neutral condition is present in the split phase power system by determining when a power current is present on one or both of the first and second powered lines while a return current is not present on the neutral line; and in response to detecting that the open neutral condition is present, causing an interrupter to interrupt the power supplied by the first and second powered lines or to generate a signal indicating an open condition.

20 Claims, 8 Drawing Sheets

Related U.S. Application Data continuation of application No. 17/121,296, filed on Dec. 14, 2020, now Pat. No. 11,322,929, which is a continuation of application No. 15/836,481, filed on Dec. 8, 2017, now Pat. No. 10,868,417.

(60) Provisional application No. 62/432,310, filed on Dec. 9, 2016.

(58) Field of Classification Search
USPC .......................................................... 361/44
See application file for complete search history.

(56) References Cited

U.S. PATENT DOCUMENTS

| | | | | |
|---|---|---|---|---|
| 4,149,210 A * | 4/1979 | Wilson | ................ | H02H 3/093 |
| | | | | 361/96 |
| 4,164,771 A * | 8/1979 | Heinrich | ............... | H02H 3/334 |
| | | | | 324/509 |
| 5,459,630 A | 10/1995 | MacKenzie et al. | | |
| 5,555,483 A | 9/1996 | Pressman | | |
| 5,894,392 A * | 4/1999 | McDonald | ............ | H02H 3/338 |
| | | | | 361/42 |
| 5,917,686 A * | 6/1999 | Chan | .................. | H01H 83/144 |
| | | | | 361/42 |
| 6,246,558 B1 | 1/2001 | DiSalvo et al. | | |
| 6,614,636 B1 | 9/2003 | Marsh | | |
| 7,944,331 B2 | 5/2011 | Porter et al. | | |
| 8,134,820 B1 | 3/2012 | Riccio et al. | | |
| 8,891,219 B2 * | 11/2014 | Czarnecki | ............... | H02H 3/20 |
| | | | | 361/91.1 |
| 8,964,345 B2 | 2/2015 | Czarnecki | | |
| 9,001,477 B2 | 4/2015 | Hughes | | |
| 10,868,417 B2 | 12/2020 | Oldham, Jr. et al. | | |
| 11,322,929 B2 | 5/2022 | Oldham, Jr. et al. | | |
| 11,545,825 B2 | 1/2023 | Oldham, Jr. et al. | | |
| 2005/0122650 A1 * | 6/2005 | Beasley, III | ........ | H02H 11/001 |
| | | | | 361/90 |
| 2006/0181829 A1 * | 8/2006 | Nadipuram | ......... | H02H 1/0007 |
| | | | | 361/93.1 |
| 2006/0198067 A1 | 9/2006 | Pearse | | |
| 2007/0201170 A1 * | 8/2007 | Hooper | ................. | H02H 5/105 |
| | | | | 361/42 |
| 2007/0215576 A1 | 9/2007 | Chung | | |
| 2007/0236845 A1 * | 10/2007 | Swint | .................. | H02H 11/001 |
| | | | | 361/78 |
| 2007/0258175 A1 * | 11/2007 | Montgomery | ........ | H02H 5/105 |
| | | | | 361/42 |
| 2008/0002313 A1 * | 1/2008 | DiSalvo | ................ | H02H 3/335 |
| | | | | 361/42 |
| 2008/0007878 A1 * | 1/2008 | Gandolfi | ............... | H02H 3/14 |
| | | | | 361/42 |
| 2008/0007880 A1 * | 1/2008 | Bradley | ............... | H02H 11/002 |
| | | | | 361/42 |
| 2009/0212964 A1 | 8/2009 | Hibma et al. | | |
| 2010/0023286 A1 | 1/2010 | Rodseth et al. | | |
| 2011/0128005 A1 * | 6/2011 | Weiher | .................. | H02H 3/044 |
| | | | | 324/424 |
| 2011/0202418 A1 | 8/2011 | Kempton et al. | | |
| 2012/0268136 A1 | 10/2012 | Lee et al. | | |
| 2013/0135781 A1 * | 5/2013 | Natili | ..................... | H02H 3/20 |
| | | | | 361/91.2 |
| 2013/0197748 A1 | 8/2013 | Whitaker | | |
| 2014/0153145 A1 * | 6/2014 | Hughes | ................. | H02H 11/00 |
| | | | | 361/49 |
| 2015/0092464 A1 * | 4/2015 | Uehira | .................... | H02M 7/44 |
| | | | | 363/95 |
| 2015/0188306 A1 * | 7/2015 | Yalla | ....................... | H02H 7/16 |
| | | | | 361/15 |
| 2016/0036214 A1 * | 2/2016 | Meiri | .................... | H02H 7/263 |
| | | | | 361/87 |
| 2016/0075236 A1 | 3/2016 | Gase et al. | | |
| 2017/0110982 A1 * | 4/2017 | Tuladhar | .......... | H02M 7/53873 |
| 2017/0146572 A1 * | 5/2017 | Urankar | ................. | G05B 11/01 |
| 2017/0359009 A1 * | 12/2017 | Rozman | ................... | H02K 3/28 |
| 2018/0166875 A1 * | 6/2018 | Oldham, Jr. | .......... | H02H 5/105 |
| 2021/0210947 A1 | 7/2021 | Oldham, Jr. et al. | | |
| 2021/0273447 A1 | 9/2021 | Thomas | | |
| 2022/0224104 A1 | 7/2022 | Oldham, Jr. et al. | | |

FOREIGN PATENT DOCUMENTS

| | | | | |
|---|---|---|---|---|
| CA | 2132137 C | 12/2003 | | |
| CA | 2504917 A1 * | 10/2005 | ............ | H02H 3/162 |
| CN | 1106957 A | 8/1995 | | |
| CN | 100555785 C | 10/2009 | | |
| CN | 102916415 A | 2/2013 | | |
| CN | 104426128 B | 1/2018 | | |
| DE | 10-2011-080523 A1 | 2/2013 | | |
| DK | 2555367 T3 | 8/2016 | | |
| EP | 0649207 A1 | 4/1995 | | |
| EP | 1811627 A1 | 7/2007 | | |
| EP | 2555367 A1 | 2/2013 | | |
| GB | 2518733 A | 4/2015 | | |
| JP | H07-298477 A | 11/1995 | | |
| JP | H09-200943 A | 7/1997 | | |
| JP | 2001-136653 A | 5/2001 | | |
| JP | 3587891 B2 | 11/2004 | | |
| JP | 2006-087246 A | 3/2006 | | |
| JP | 3776651 B2 | 5/2006 | | |
| JP | 2008-517434 A | 5/2008 | | |
| JP | 4251127 B2 | 4/2009 | | |
| KR | 10-0299015 B1 | 10/2001 | | |
| KR | 10-1395551 B1 | 5/2014 | | |
| SG | 149903 A1 | 3/2009 | | |
| TW | 519787 B | 2/2003 | | |
| WO | WO-2006/042450 A1 | 4/2006 | | |
| ZA | 947019 B | 4/1995 | | |

OTHER PUBLICATIONS

Progressive Industries, Inc., *Instruction Manual, Electrical Management System (EMS)*, (12 pages), Google Index Date: May 2018. Available online: <URL: https://file.powerprodllc.com/-/media/inriver/ZX480.pdf>.

Progressive Industries, Inc., *Rv Surge Protection*, (2 pages), Copyright Date: 1999-2018, [Retrieved from the Internet Oct. 5, 2022] <URL: https://www.progressiveindustries.net/#!ems-pt50c/c1ma0>.

* cited by examiner

OPEN NEUTRAL DETECTOR

CROSS-REFERENCE TO RELATED APPLICATIONS

The present application is a continuation of U.S. application Ser. No. 17/711,582, filed Apr. 1, 2022, which is a continuation of U.S. application Ser. No. 17/121,296, filed Dec. 14, 2020, now U.S. Pat. No. 11,322,929, which is a continuation of U.S. application Ser. No. 15/836,481, filed Dec. 8, 2017, now U.S. Pat. No. 10,868,417, which claims priority from U.S. Provisional Application No. 62/432,310, filed Dec. 9, 2016, each of which is incorporated herein by reference in its entirety.

BACKGROUND

Split phase power systems consist of two line conductors, or powered lines, which provide electrical power to a distribution system or a connected electric appliance. The two line conductors of the split phase power utilize one shared neutral line. A failure in the neutral line can cause an open neutral condition to persist, resulting in overvoltage and under-voltage conditions to occur on the powered lines. An open neutral condition can cause failure and damage to electrical and electronic devices connected to the powered lines.

A common application of split phase power systems is a 50 ampere (A) Recreational Vehicle (RV) service. An RV typically requires large amounts of electricity to power all of the appliances (e.g. microwaves, a refrigerators, pumps) and other electrical devices (e.g. Televisions, computers, chargers) located on the RV. This large power requirement can be efficiently delivered with the reduced wiring requirements of a split phase power system. Many RV power services are located in campgrounds or other outdoor environments, which may leave electric connection components at a power connection pedestal open to weathering and corrosion. This weathering and corrosion can include rusting of the metal electrical connectors or a breakdown in the other connection materials of a power outlet into which an RV owner would plug their connection. The corrosion and break down of the connection at the power pedestal may cause a bad connection in the neutral line of the split phase power system, resulting in an open neutral condition or high impedance on the neutral line. Due to the mobility of RVs, RV owners frequently connect to outlets with which they are unfamiliar and that may include weathered power pedestals susceptible to open neutral conditions or to electrical systems that may simply be wired incorrectly, which opens the RV owner to the threat of open neutral conditions occurring in the RV.

Another common cause of open neutral conditions forming in RVs include wiring problems on the RV side of the power pedestal. For example, an RV may also suffer from incorrect or corroded onboard wiring, which opens up another potential source of an open neutral condition.

This high susceptibility for 50 A RV electric service to experience high resistance or open neutral conditions has led to some methods and protection devices that attempt to protect against open neutral conditions from damaging electrical and electronic devices. However, these devices and methods fail to detect open neutral conditions downstream of the power pedestal (or load side of the protection device) from the detection device. This can lead to open neutral conditions forming at the RV and causing damage to electrically powered devices without any indication there is an open neutral at the protection device.

Accordingly, there is an ongoing need in the art to provide protection against open neutral conditions that may develop on either side of an open neutral protection device.

BRIEF SUMMARY

Various embodiments of the present invention are directed to an apparatus for detecting an open neutral condition in a split phase power system for delivering power to an electrical distribution system. In various embodiments, the apparatus includes a first powered line configured to output electricity to the electrical distribution system; a second powered line configured to output electricity to the electrical distribution system; and a shared neutral line configured to provide a grounded neutral to the first and second powered lines. One or more power monitors are provided for measuring the current on the first powered line, second powered line, and shared neutral line. In addition, the apparatus includes an interrupter configured to selectively interrupt power supplied by the first and second powered lines, and a controller comprising a processor in communication with the one or more power monitors and the interrupter. The controller is configured for: (i) detecting when an open neutral condition is present in the split phase power system by determining instances when a power current is present on one or both of the first and second powered lines while a return current is not present on the neutral line; and (ii) in response to detecting that the open neutral condition is present, causing the interrupter to interrupt the power supplied by the first and second powered lines.

In certain embodiments, the one or more power monitors comprise a first transformer connected to the first powered line and a second transformer connected to the second powered line; and wherein the controller is configured for measuring a first current on the first powered line utilizing the first transformer and for measuring a second current on the second powered line utilizing the second transformer.

In certain embodiments, the controller is configured to determine that the return current is not present on the neutral line by detecting instances when the first current on the first powered line is equal to the second current on the second powered line.

In certain embodiments, the controller is configured to determine that the return current is not present on the neutral line by calculating a neutral current using the first and second current.

In certain embodiments, the one or more power monitors further comprise a third transformer connected to the shared neutral line; and wherein the controller is configured for measuring a third current on the shared neutral line utilizing the third transformer.

In certain embodiments, the controller is configured to determine that the return current is not present on the neutral line by detecting instances when the third current on the shared neutral line is approximately zero.

In certain embodiments, the one or more power monitors comprise a first transformer connected to the first powered line, a second transformer connected to the second powered line; a third transformer connected to the first and second powered line; and wherein the controller is configured for measuring a first current on the first powered line utilizing the first transformer, for measuring a second current on the second powered line utilizing the second transformer, and for measuring a difference between the first and second power lines using an output from the third transformer.

In certain embodiments, the controller is configured to determine that the return current is not present on the neutral line by detecting instances when the output from the third transformer is zero.

In certain embodiments, detecting when an open neutral condition is present in the split phase power system by determining instances when a power current is present on one or both of the first and second powered lines while a return current is below a preset threshold. In one example, the preset threshold is 0.5 Amps.

In certain embodiments, the interrupter comprises: a driver interface in communication the controller; and a main contactor connected to the driver interface and configured to interrupt power to the first and second powered lines.

In certain embodiments, the apparatus further comprises a power source plug configured for being mated to a 50 A power pedestal.

In certain embodiments, the apparatus further comprises an output power plug configured to accept a 50 A-rated plug from a recreational vehicle (RV) power distribution system.

In certain embodiments, the first powered line, the second powered line, and the neutral line are connected to a power source and wherein the first powered line, the second powered line, and the neutral line are connected to a single appliance.

In certain embodiments, the first powered line, the second powered line, and the neutral line are connected to a recreational vehicle (RV) service configured to supply fifty amps (A) of electrical current and wherein the first powered line, the second powered line, and the neutral line are connected to an RV electrical distribution system.

In certain embodiments, the apparatus further comprises an open neutral indication light, wherein the controller is configured to illuminate the open neutral indication light in response to detecting that the open neutral condition is present.

In certain embodiments, the apparatus further comprises a graphical user interface, wherein the controller is configured to present a graphical indication in response to detecting that the open neutral condition is present.

In certain embodiments, the processor is configured to, upon determining that the power current is present on at least one of the first and second powered lines, allow a predefined period of time to elapse before determining whether the return current is present on the shared neutral line.

In another example embodiment, an apparatus for detecting an open neutral condition in a split phase power system for delivery power to an electrical distribution system is provide. The apparatus comprising: a first powered line configured to output electricity to the electrical distribution system; a second powered line configured to output electricity to the electrical distribution system; a shared neutral line configured to provide a grounded neutral to the first and second powered lines; one or more power monitors configured for measuring the current on the first powered line, second powered line, and shared neutral line; and a controller comprising a processor in communication with the one or more power monitors and the interrupter, the controller configured for: detecting when an open neutral condition is present in the split phase power system by determining instances when a power current is present on one or both of the first and second powered lines while a return current is not present on the neutral line; and in response to detecting that the open neutral condition is present, generating a signal indicating an open neutral condition.

In certain embodiments. the signal is configured to interrupt power supplied by the first and second powered lines.

In certain embodiments, the controller is further configured for, in response to detecting that the open neutral condition is present, generating an open neutral condition indication.

In certain embodiments, the apparatus further comprises an open neutral indication light, wherein the controller is configured to illuminate the open neutral indication light in response to the generation of the open neutral indication.

In certain embodiments, the apparatus further comprises a graphical user interface, wherein the controller is configured to present a graphical indication in response to the generation of the open neutral indication.

BRIEF DESCRIPTION OF THE DRAWINGS

Reference will now be made to the drawings, which are not necessarily drawn to scale, and wherein.

DETAILED DESCRIPTION OF VARIOUS EMBODIMENTS

Figure 1A:
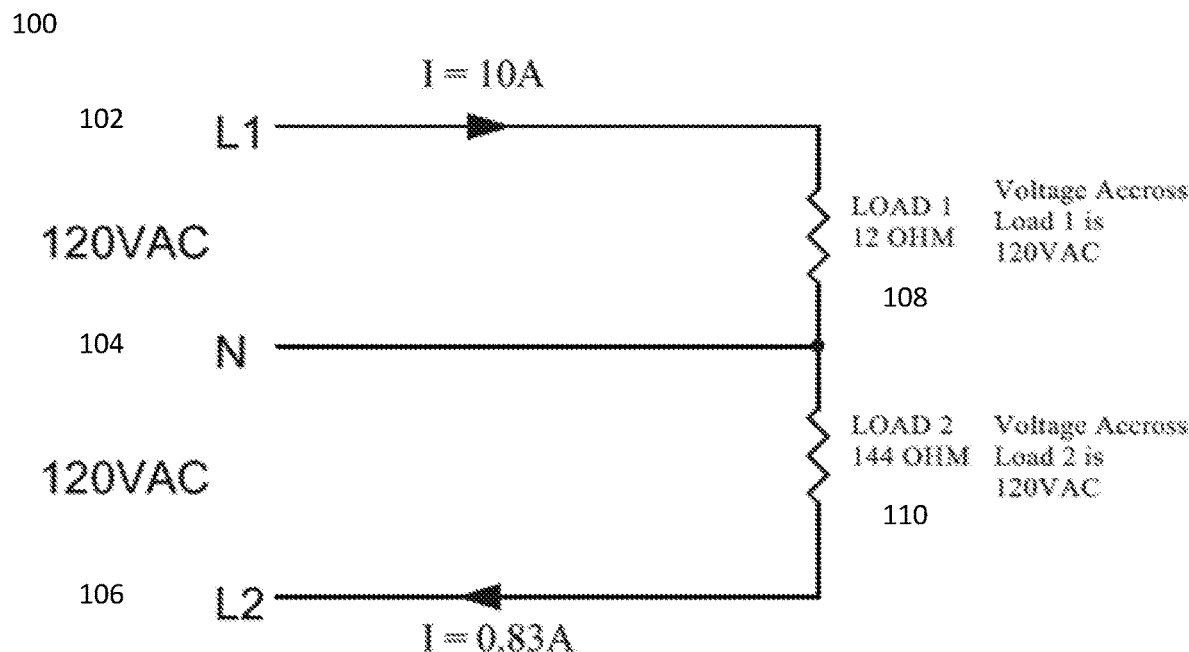
FIG. 1A shows an example split phase power system under normal conditions according to one embodiment.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

Various embodiments of the present invention are directed to a system for detecting an open neutral condition in a split phase powered system. According to various embodiments, the system generally comprises an input power source consisting of two powered conductor lines and one neutral line. The system also comprises an open neutral detector configured to measure the currents on the two powered conductor lines and the one neutral line. The open neutral detector is generally configured to detect an open neutral condition when the powered conductor lines have current present and the neutral line has a zero or very low current.

In some embodiments, an open neutral detector monitors a neutral current on a neutral line along with powered currents on the powered lines in a split phase power system by means of software or firmware running on a processor or controller. However, in some embodiments, monitoring a neutral line current along with powered line currents can be implemented using analog hardware. In some example embodiments, the open neutral detector utilizes the monitored current inputs to test for an open or impeded neutral condition. For example, if the neutral current on the neutral line has low current or is a zero current while the powered lines have a non-zero current, then the open neutral detector determines that that neutral line is open or impeded indicating an open neutral condition is present. In some further examples, the open neutral detector is configured to interrupt the power supply of the powered lines in order to protect against damage from overvoltage conditions. In another example, the open neutral detector can interrupt the power supply to the powered lines by means of a driver driving a switching device, such as a main contactor in a surge protector to interrupt the power supply.

In some example embodiments, a perfectly balanced load in split phase power system (i.e. the same load or resistance on both powered lines) may result in a neutral current that is a low current or a zero current. However, in most split phase power systems each load of the split phase system is never or very rarely equal. Since the loads are very rarely equal, the neutral current on the neutral line can be used as in indicator to determine if the neutral line is open or impeded. Utilizing this principle an open neutral detector will monitor the neutral current on the neutral line and determine that the neutral line is open or impeded when the neutral current is very low or a zero current. In some examples, the neutral current will also be very low or zero when there are no loads on either of the powered lines of a split phase power system. Thus in some embodiments, the open neutral detector is configured to monitor the power lines to distinguish between an unloaded system where the current on every line including the neutral line is zero and an open or impeded neutral condition where the powered lines will experience currents and the neutral line will experience a very low or zero current. In some examples, a very low current may be below a preset threshold. For example, a very low current may be less than 0.5 Amps (A). In some examples, the threshold may also include values between 0.5 A and 0.7 A.

FIG. 1A shows an example split phase power system 100 under normal conditions. In the illustrated embodiment, line 1 (L1) 102 is a first powered line conductor in the split phase power system 100. The current on L1 102 is 10 A with a Load 1 of 12 ohms. In an RV environment, Load 1 of 12 ohms may be, for example, a running RV air-conditioning unit. The voltage across Load 1 is 120 voltage alternating current (VAC).

Line 2 (L2) 106 is the second powered line conductor in the split phase power system 100. The current on L2 106 is 0.83 A with a Load 2 of 144 ohms. In an RV environment, Load 2 110 of 12 ohms may be, for example, the resistance provided by a light bulb or an idle microwave oven unit. The voltage across Load 2 110 is also 120 VAC.

Neutral line N 104 is the neutral line in the split phase power system 100 providing the grounded neutral to the powered lines L1 102 and L2 106. The current across N 104 is the difference in the currents of the powered lines L1 102 and L2 106 (i.e. 10 A−0.83 A) or 9.17 A in the split phase power system 100 under normal conditions.

Figure 1B:
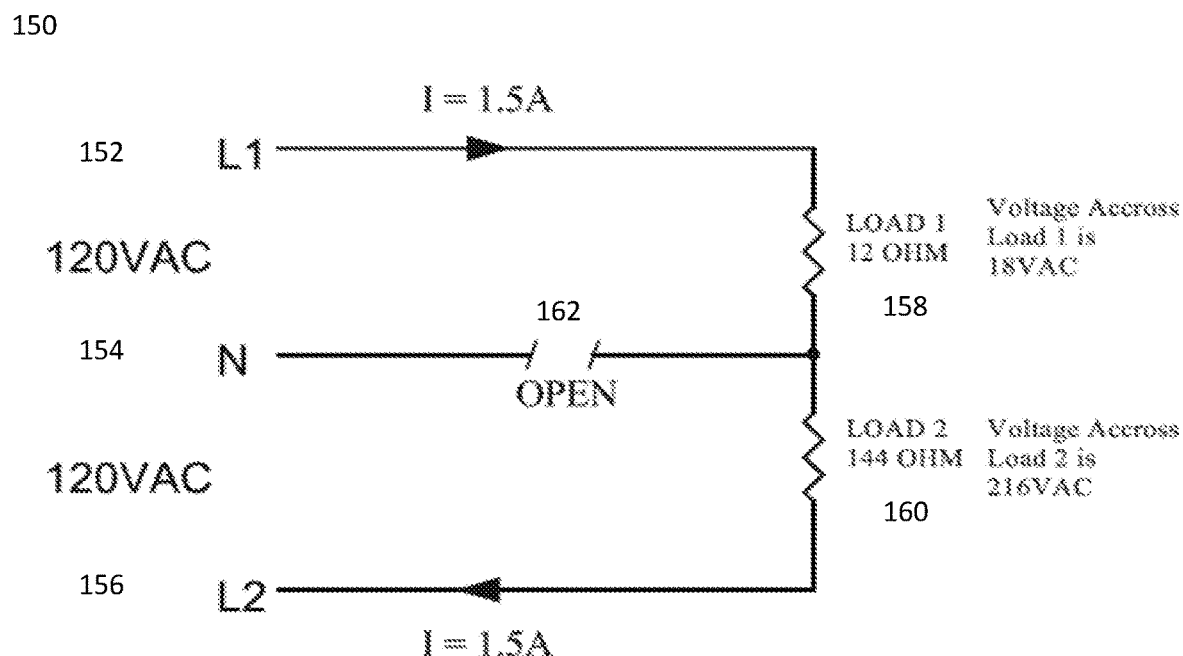
FIG. 1B shows example split phase power system under open neutral conditions according to one embodiment.

FIG. 1B shows example split phase power system 150 under open neutral conditions. In the illustrated embodiment, the current on L1 102 is now 1.5 A with a Load 1 of 12 ohms, and the voltage across Load 1 is now 18 VAC due to the lack of a neutral reference. The current on L2 106 is now 1.5 A with a Load 2 160 of 144 ohms, and the voltage across Load 2 116 is now 216 VAC. This high voltage loading in L2 156 will likely cause damage to any electrical device, electronic device, or appliance connected to the line.

Neutral line N 154 is the neutral line in the split phase power system 150 experiencing an open neutral condition, exemplified by open neutral condition 162. In some examples, open neutral condition 162 may be a complete loss of electrical conductivity, for example a disconnected neutral wire. In some examples, the open neutral condition 162 may be a high impedance condition caused by a partially connected or corroded wire. In some examples, the current across N 154 may zero in an instance when there is a complete loss of electrical conductivity. In some examples, the current across N 154 may be very close to zero in an instance when there is high impedance on Line N 154.

Figure 2:
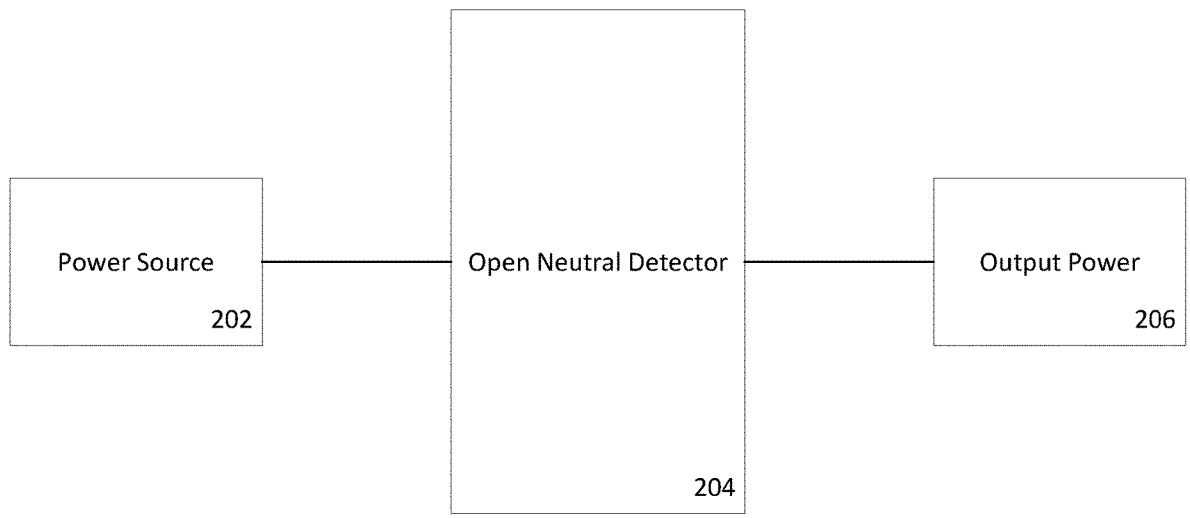
FIG. 2 shows a schematic diagram of an open neutral detector system according to one embodiment.

FIG. 2 shows a schematic diagram of an open neutral detector system 200 according to various embodiments. In the illustrated embodiment of FIG. 2, the open neutral detector system 200 includes a power source 202, an open neutral detector 204, and an output power 206. According to various embodiments, the power source 202 is configured to provide split phase power. In one example, this may be a 50 A RV service provided at a power pedestal.

The open neutral detector 204 is configured to detect an open neutral condition in the system 200. In certain embodiments, the open neutral detector 204 incudes a controller (e.g., as shown and described in FIGS. 3 and 4) and is configured to perform the steps of detecting an open neutral condition as described in FIG. 5. Additionally, in certain embodiments, the open neutral detector 204 may be configured to function as a surge protector as described in FIG. 6. In some examples, open neutral detector system 200 includes an output power 206. In some examples, the output power may provide power to a RV.

Figure 3A:
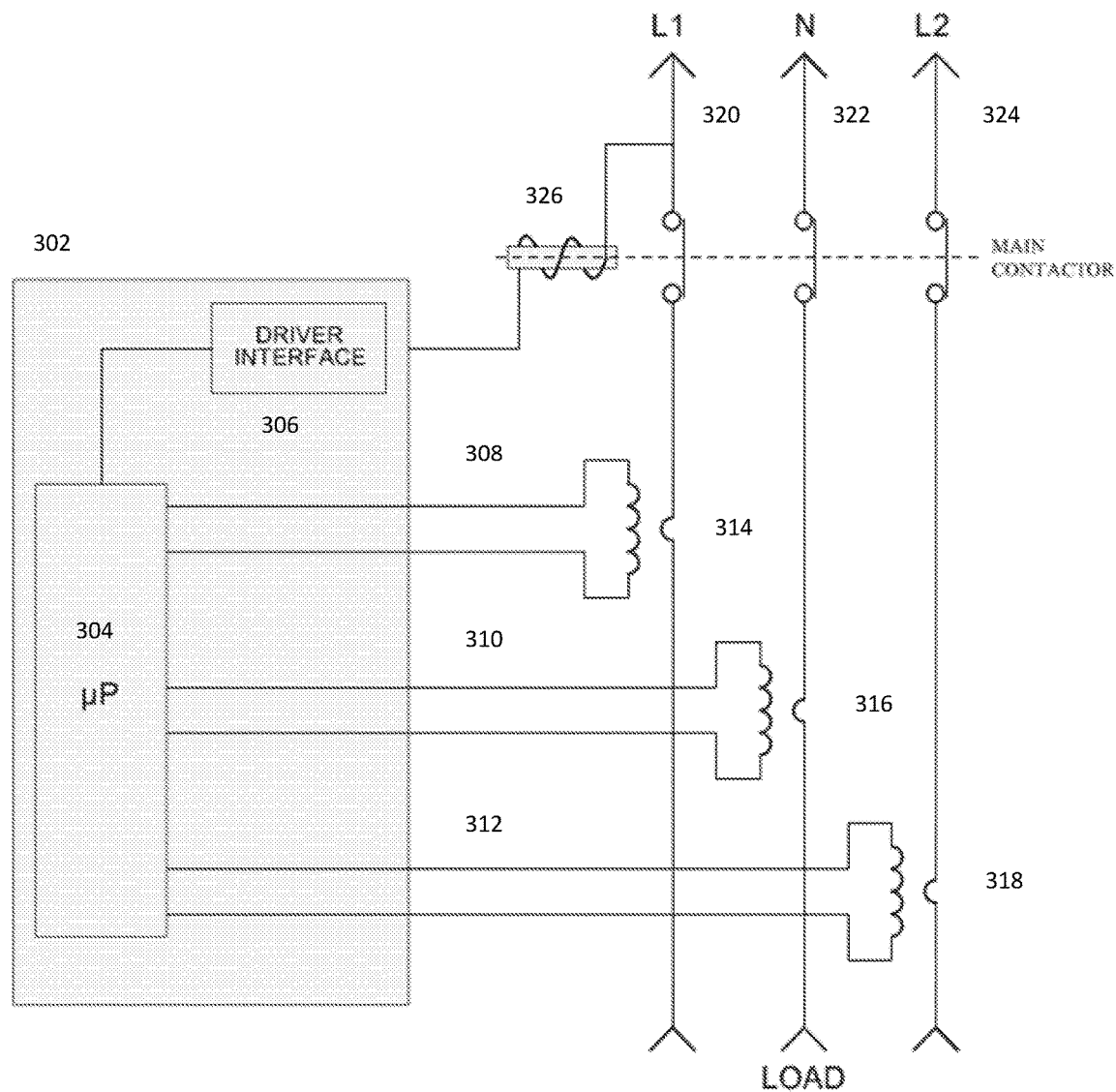
FIG. 3A shows a schematic diagram of an open neutral detector according to one embodiment.

FIG. 3A shows a schematic diagram of an apparatus for detecting an open neutral condition in a split phase power system for delivery power to an electrical distribution system such as the open neutral detector 204 according to one embodiment. In the illustrated embodiment, the open neutral detector 204 includes a controller 302. Controller 302 includes a microprocessor 304 and a driver interface 306. In some examples, microprocessor 304 is connected to transformers such as transformers 314, 316, and 318 through connections 308, 310, and 312. Transformer 314 is configured to measure the current of a first powered line in a split phase power system, such as line 320. Transformer 318, is configured to measure the current of a second powered line in a split phase power system, such as line 324. Transformer 316, is configured to measure the current of a neutral line in a split phase power system, such as line 322. In some examples, microprocessor 304 is configured to determine if an open neutral condition is present from the measured currents from transformers 314, 316, and 318. If microprocessor 304 determines an open neutral condition is present, microprocessor 304 will drive a driver interface, such as driver interface 306, to interrupt the power source providing power to the powered lines, such as powered lines 320 and 324. In some examples, driver interface 306 may interrupt power source 202 connected to the open neutral detector 204. In some example embodiments, driver interface 306 will drive a main contactor, such as main contactor 326 to interrupt the powered lines 320 and 324. While illustrated in FIGS. 3A-3B as a component of open neutral detector 204, the main contactor 326 (the interrupter) may comprise a device remote from the open neutral detector 204 and configured to receive a signal from the open neutral detector 204.

Figure 3B:
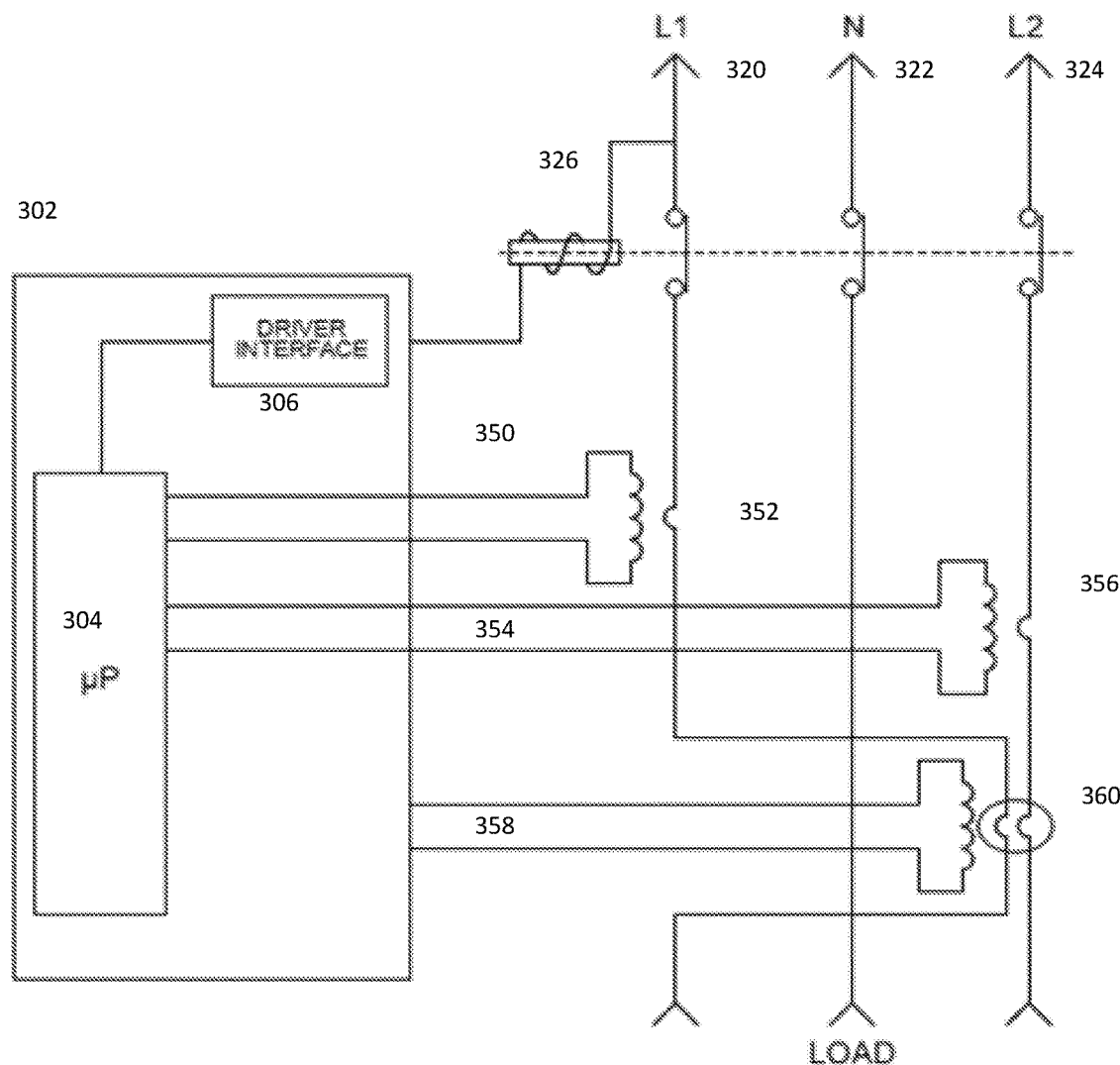
FIG. 3B shows a schematic diagram of an open neutral detector according to another embodiment.

FIG. 3B shows an alternative embodiment of the apparatus for detecting an open neutral condition in a split phase power system for delivery power to an electrical distribution system such as the open neutral detector 204. As shown in FIG. 3B, the open neutral detector 204 includes the controller 302, including the microprocessor 304 and the driver interface 306. In the illustrated example of FIG. 3B, microprocessor 304 is connected to transformers such as transformers 352, 356, and 360 through connections 350, 354, and 358. Transformer 352 is configured to measure the current of a first powered line in a split phase power system, such as line 320. Transformer 316, is configured to measure the current of a second powered line in a split phase power system, such as line 324. Transformer 360, is configured to measure the current of both the first and second powered lines (lines 320 and 324). In this example, transformer 360 is configured to add the currents from the first and second power lines to output a difference of the two, which is equivalent to the current on neutral, such as line 322. The microprocessor 304 may then determine if an open neutral condition exists, if the current is equal in both lines and the output of transformer 360 is zero.

Figure 3C:
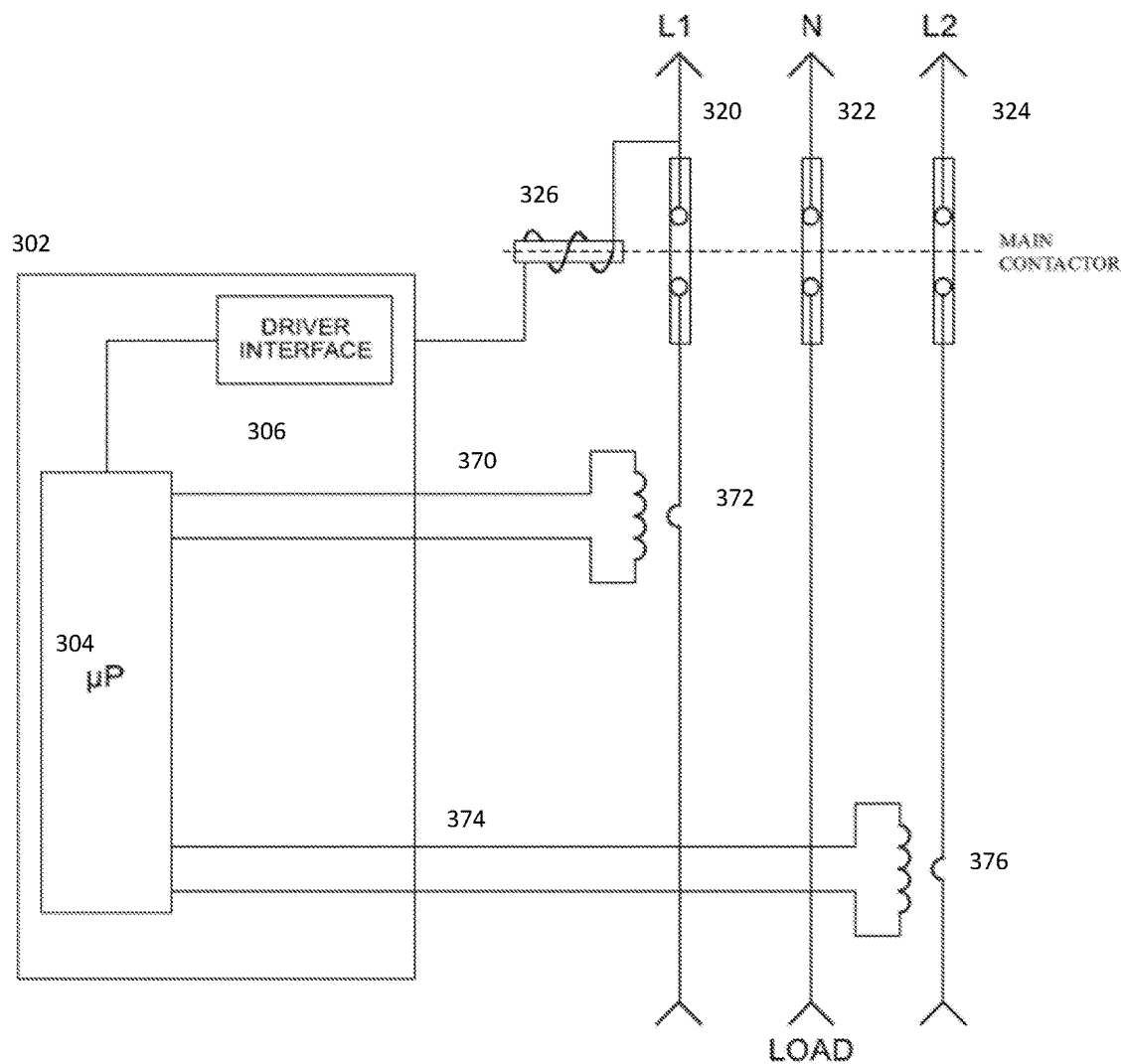
FIG. 3C shows a schematic diagram of an open neutral detector according to another embodiment.

FIG. 3C shows an alternative embodiment for the apparatus for detecting an open neutral condition in a split phase power system for delivery power to an electrical distribution system such as the open neutral detector 204. As shown in FIG. 3C, the open neutral detector 204 includes the controller 302, including the microprocessor 304 and the driver interface 306. In the illustrated example of FIG. 3B, microprocessor 304 is connected to transformers such as transformers 352, 356, and 360 through connections 370 and 374. Transformer 370 is configured to measure the current of a first powered line in a split phase power system, such as line 320. Transformer 376, is configured to measure the current of a second powered line in a split phase power system, such as line 324. In this example, microprocessor 304 is configured to uses vector math to calculate a neutral current. For example, since the first and second powered lines (line 320 and line 324) are 180 degrees out of phase, the microprocessor 304 may calculate the neutral current by the addition of the first and second power line currents. If the calculated neutral current is zero or close to zero an open neutral condition is present.

Figure 4:
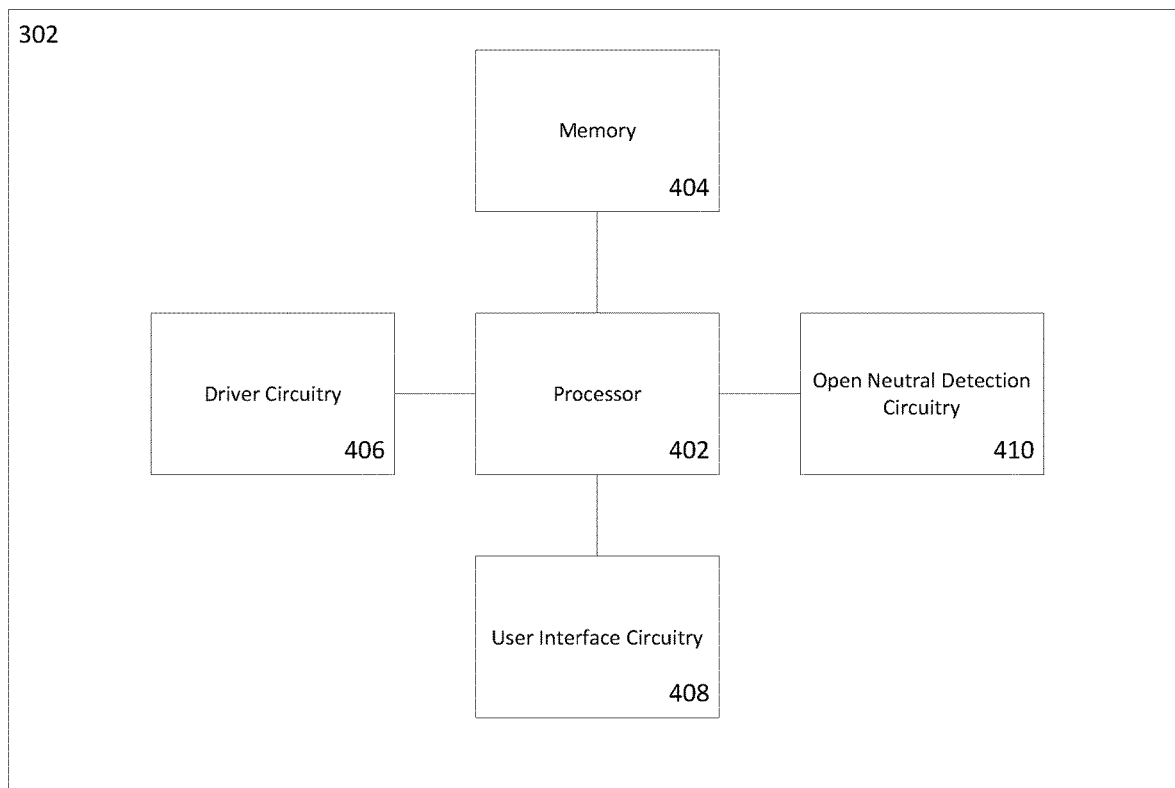
FIG. 4 shows an exemplary block diagram of an open neutral detector controller according to one embodiment.

FIG. 4 shows an exemplary block diagram of an open neutral detector controller according to one embodiment. In the illustrated embodiment, controller 302 includes a processor 402, memory 404, driver circuitry 406, user interface circuitry 408, and open neutral detection circuitry 410. In some examples, processor 402 is embodied as a microprocessor 304. As shown, memory 404 is configured to store software or firmware configured to provide instructions, such as computer instructions or computer code, in conjunction with processor 402 and circuitries 406, 408, and 410 to determine if an open neutral condition is present in a an open neutral detector, such as open neutral detector 204. In some examples, driver circuitry 406 is configured to drive a main contactor, such as main contactor 326, to interrupt a power source in a split phase power system. In some examples, user interface circuitry 408 is configured to provide an indication to a user that an open neutral condition is present in a split phase power system. For example, user interface circuitry 408 may indicate an open neutral condition on a liquid crystal display (LCD) screen or may be configured to light a light emitting diode (LED) light to indicate to a user that an open neutral condition is present in a split phase power system.

Figure 5:
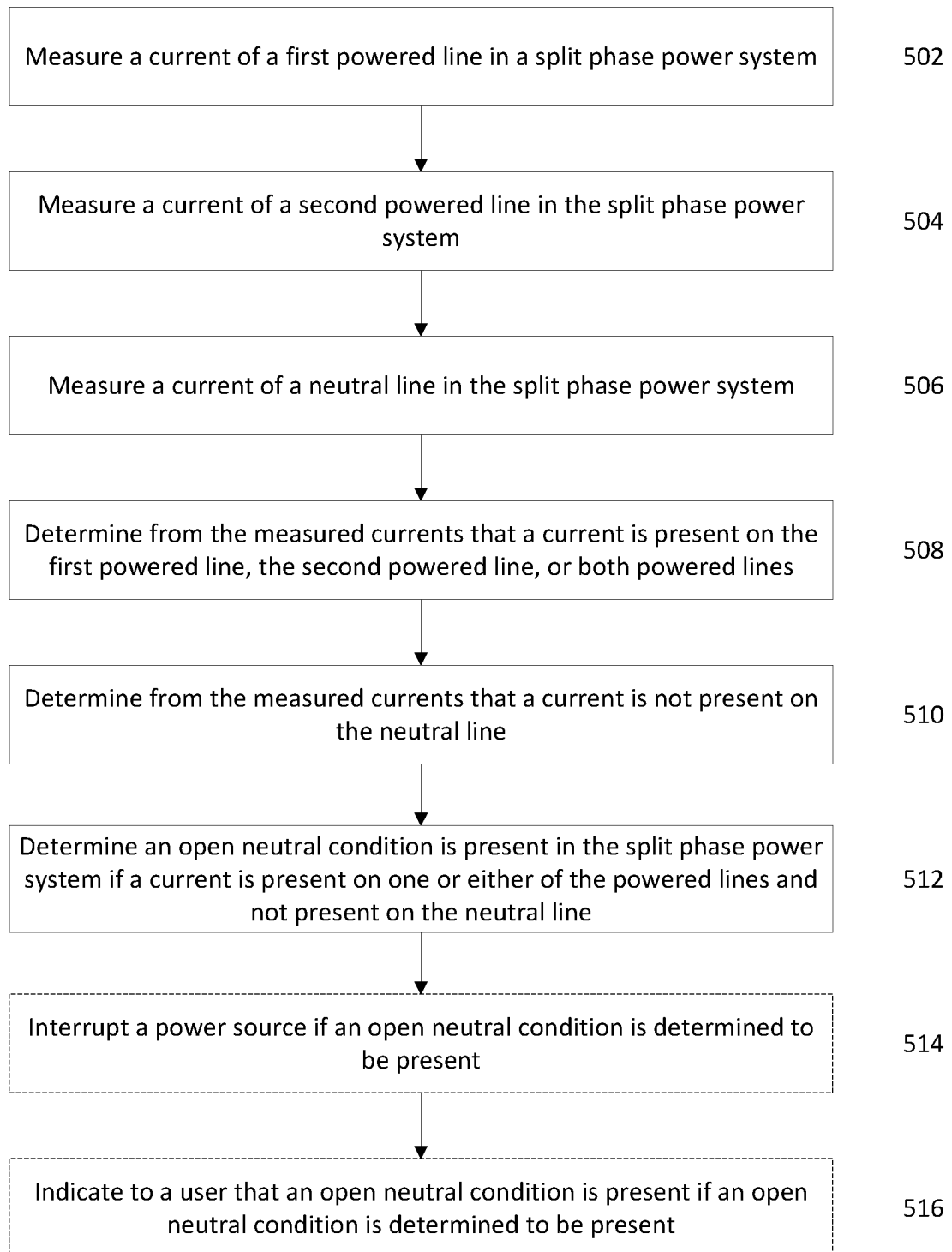
FIG. 5 shows an exemplary flowchart illustrating an example method for detecting an open neutral condition according to one embodiment.

FIG. 5 shows an exemplary flowchart illustrating an example method for detecting an open neutral condition. In some examples, the operations are performed by the open neutral detector 204 of FIG. 2 utilizing a controller, such as described in FIGS. 3 and 4. As shown in block 502, open neutral detector 204, including controller 302, and processor 402 may be configured to measure a current of a first powered line in a split phase power system. For example, the first powered line may comprise line 320 in an open neutral detector 204. In some examples, the current of the first powered line may be measured utilizing a transformer, such as transformer 314. In one example, the measured current may be 10 A as described in relation to L1 102 in FIG. 1A. In another example, the current may be 1.5 A as described in relation to L1 102 in FIG. 1B.

As shown in block 504, open neutral detector 204, including controller 302, and processor 402 may be configured to measure a current of a second powered line in the split phase power system. For example, the second powered line may comprise line 324 in an open neutral detector 204. In some examples, the current of the second powered line may be measured utilizing a transformer, such as transformer 318. In one example, the current may be 0.83 A as described in relation to L2 106 in FIG. 1A. In another example, the current may be 1.5 A as described in relation to L2 106 in FIG. 1B.

As shown in block 506, open neutral detector 204, including controller 302, and processor 402 may be configured to measure a current of a neutral line in the split phase power system. For example, the neutral line may comprise line 322 in an open neutral detector 204. In some examples, the neutral line may be measured utilizing a transformer, such as transformer 316. In one example, the current may be 9.17 A as described in relation to N 104 in FIG. 1A. In another example, the current may be OA as described in relation to N 104 in FIG. 1B.

As shown in block 508, open neutral detector 204, including controller 302, and processor 402 may be configured to determine from the measured currents that a current is present on the first powered line, the second powered line, or both powered lines. For example, L1 and L2 in both FIGS. 1A and 1B have powered currents. In a different example, only one of the two powered lines may contain a current. For example, line 320 may have current while line 324 does not have current. In this example, controller 302 is still configured to determine that a current is present on a powered line.

As shown in block 510, open neutral detector 204, including controller 302, and processor 402 may be configured to determine from the measured currents that a current is not present on the neutral line. In some examples, controller 302 may not need to utilize a transformer, such as transformer 316, to measure the current on the neutral line. For example, if transformers 314 and 318 measure equal current on both powered lines, such as lines 320 and 324, then the neutral current is assumed to be zero and an open neutral condition is present and detected. In some embodiments, transformer 316 is utilized to determine that there is a very low current or a zero current on line 322.

As shown in block 512, open neutral detector 204, including controller 302, and processor 402 may be configured to determine an open neutral condition is present in the split phase power system if a current is present on one or either of the powered lines and not present on the neutral line. For example, as shown in FIG. 1B, the powered lines L1 102 and L2 106 both contain currents of 1.5 A. Controller 302 is configured determine that an open neutral, such as open neutral condition 162 is present by determining that a current is present on one or either of the powered lines and not present (or a zero current) on the neutral line N 104. In some examples, the current on N 104 as shown in FIG. 1B may be very low or close to zero, which also indicates an open neutral condition.

Alternatively, as shown in FIG. 1A, if the powered lines L1 102 and L2 106 both contain currents and the neutral line N 154 also contains a current, then controller 302 is configured to determine an open neutral condition is not present. In some examples, such as during the beginning of a current flow across the powered lines, there may be a current present on the powered lines, but not on the neutral line. In this example, controller 302 is configured to allow for period of time for the current to circulate before attempting to detect of an open neutral condition.

As shown in block 514, open neutral detector 204, including controller 302, and processor 402 may be optionally configured to interrupt a power source, such as power source 202, if an open neutral condition is determined to be present at block 512. In some examples, driver circuitry 406 is configured to drive a driver interface, such as driver interface 306, to interrupt a power source utilizing a main contactor, such as main contactor 326.

As shown in block 516, open neutral detector 204, including controller 302, and processor 402 may be optionally configured to indicate to a user that an open neutral condition is present if an open neutral condition is determined to be present at block 512. In some examples, user interface circuitry 408 is configured to indicate to a user through an LCD screen or LED lights that an open neutral condition is present.

Figure 6:
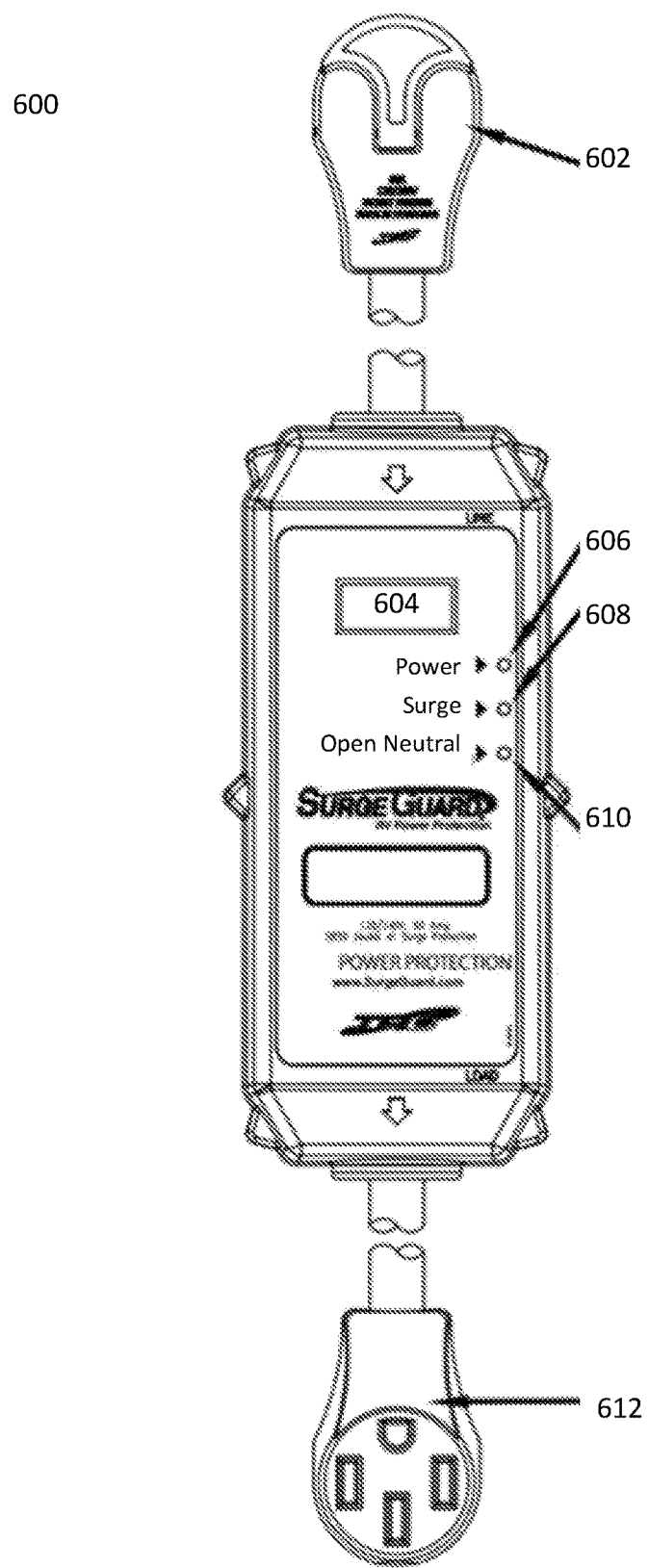
FIG. 6 shows an example application embodiment of surge protector, according to one embodiment.

FIG. 6 shows an example application embodiment of surge protector, such as surge protector 600, according to one embodiment. In the illustrated embodiment, surge protector 600 comprises a power source 602, output power 612, and user interface components including LCD screen 604 and LED indicator lights 606, 608, and 610. In some examples, an open neutral detector, such as open neutral detector 204 is embodied in a surge protector 600 and utilizes power source 602 as power source 202 and outputs output power 206 as output power 612. In an example embodiment, user interface components, such as an LCD screen 604 and LED lights 606, 608, and 610 indicate various functions of the surge protector 600, such as power on, surge detected, and open neutral detected. In some examples, the user interface components are configured to indicate to a user that an open neutral condition is present, as described in relation to block 516 in FIG. 5. For example, LCD screen 604 may indicate read out "Open Neutral" or LED 610 may light up if an open neutral condition is present.

In one embodiment, power source 602 is a plug configured to plug into a 50 A RV service power pedestal. Furthermore, output power 612 is a plug configured to accept a 50 A rated plug from an RV power distribution system.

Moreover, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the application.

The invention claimed is:

1. A device for detecting an open neutral condition in a split phase power system for delivering power to an electrical distribution system, the device configured for being electrically coupled upstream of the device to a power source and downstream of the device to the electrical distribution system, and comprising:
   a plurality of power monitors comprising a first power monitor configured for monitoring a first current on a first powered line connected to the electrical distribution system, a second power monitor configured for monitoring a second current on a second powered line connected to the electrical distribution system and a third power monitor configured for monitoring a third current on a neutral line connected to the electrical distribution system;
   a controller in communication with the plurality of power monitors, the controller configured for:
      detecting when an open neutral condition is present in the electrical distribution system by determining, based at least in part on one or more of the first current, the second current, and the third current, instances when a power current is present on one or both of the first and second powered lines while a return current is not present on the neutral line, and
      causing an indication that the open neutral condition is present in the electrical distribution system in response to detecting the open neutral condition.

2. The device of claim 1, wherein the electrical distribution system downstream of the device is connected to the load of an RV.

3. The device of claim 1, wherein a detected open neutral condition in the electrical distribution system is an open neutral condition in the RV wiring.

4. The device of claim 1, wherein the controller is further configured for detecting an open neutral condition upstream of the device at a campground power outlet.

5. The device of claim 1, further comprising an indicator, wherein the controller is configured to cause the indication that the open neutral condition is present in the electrical distribution system using the indicator.

6. The device of claim 5, wherein the indicator comprises an indication light, and wherein the controller is configured to cause the indication light to be illuminated in response to detecting that the open neutral condition is present.

7. The device of claim 5, wherein the indicator comprises a display screen, and wherein the controller is configured to cause the display screen to visually indicate that the open neutral condition is present in response to detecting that the open neutral condition is present.

8. The device of claim 5, further comprising an interrupter in communication with the controller.

9. The device of claim 8, wherein in response to detecting that the open neutral condition is present in the electrical distribution system, the controller is configured to cause the interrupter to interrupt power supplied by the first and second powered lines.

10. The device of claim 9, wherein the device powers the indicator in response to detecting the open neutral condition is present in the electrical distribution system.

11. The device of claim 8, wherein in response to detecting that the open neutral condition is present, the controller is configured to cause the interrupter to interrupt the power source providing power to the first and second powered lines.

12. The device of claim 1, wherein the controller comprises a processor, and wherein the processor is configured to execute stored instructions to determine when the open neutral condition is present in the electrical distribution system.

13. The device of claim 12, wherein the controller is configured to utilize one or more of stored software or firmware to execute stored instructions to detect when the open neutral condition is present.

14. The device of claim 1, wherein the device comprises analog hardware configured for detecting when the open neutral condition is present.

15. The device of claim 1, wherein the controller is configured to determine that the return current is not present on the neutral line by detecting instances when the third current is approximately zero.

16. The device of claim 1, wherein the controller is configured to determine that the return current is not present on the neutral line by detecting instances when the third current is below a threshold current value.

17. The device of claim 16, wherein the threshold current value is 0.5 Amps.

18. The device of claim 16, wherein the threshold current value is between 0.5 and 0.7 Amps.

19. The device of claim 1, wherein the first powered line, the second powered line, and the neutral line are connected to an RV campground outlet configured to supply at least approximately fifty amps of electrical current.

20. The device of claim 1, wherein detecting that the open neutral condition is present comprises, upon determining that the power current is present on at least one of the first and second powered lines, allowing a period of time to elapse before determining whether the return current is present on the neutral line.

\* \* \* \* \*